March 22, 1955     R. C. MEIER, JR     2,704,626
PAIR OF BICYCLE BASKETS
Filed Oct. 30, 1950
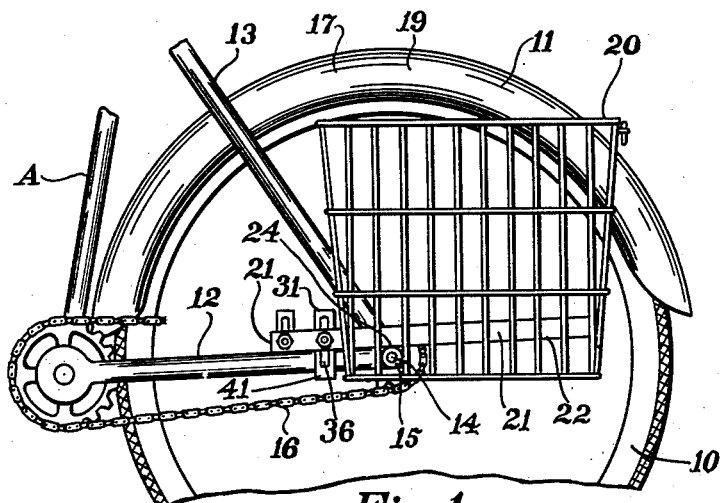
Fig. 1.
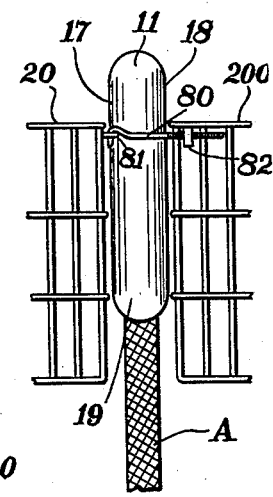
Fig. 2.
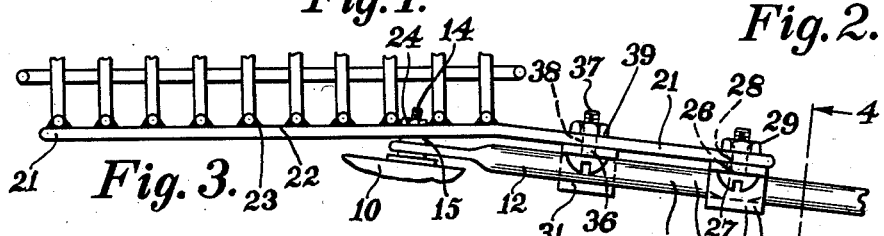
Fig. 3.
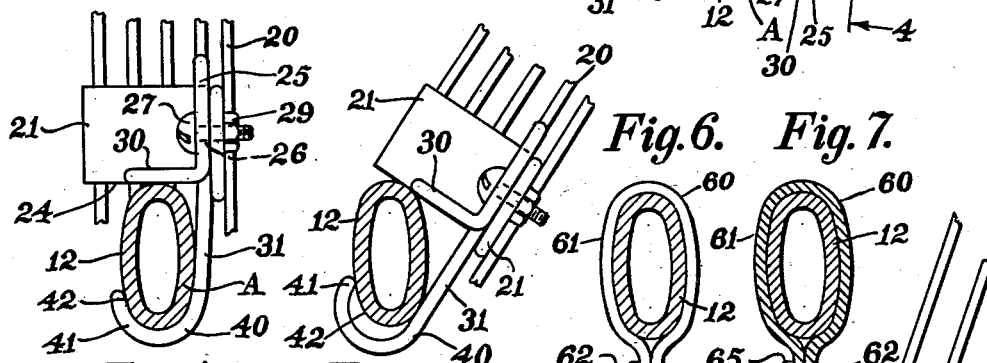
Fig. 4.    Fig. 5.    Fig. 6.    Fig. 7.
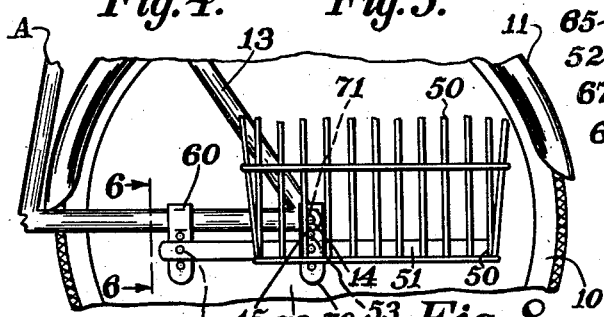
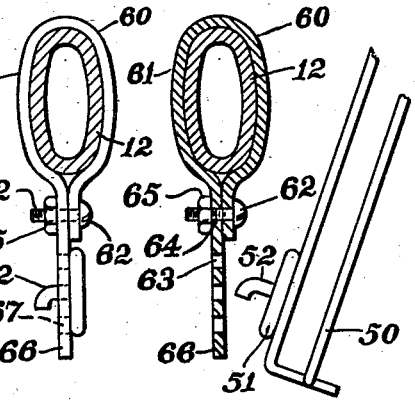
Fig. 8.
INVENTOR.
Robert C. Meier Jr.
BY
Pearson + Pearson
attorneys

United States Patent Office 2,704,626
Patented Mar. 22, 1955

2,704,626

PAIR OF BICYCLE BASKETS

Robert C. Meier, Jr., Salem, N. H., assignor to Berkeley Manufacturing Company, Incorporated, Lawrence, Mass., a corporation of Massachusetts Application October 30, 1950, Serial No. 192,882

6 Claims. (Cl. 224—32)

This invention relates to bicycle baskets such as are used on each side of the rear wheel of a bicycle.

The principal object of my invention is the provision of a pair of baskets which are rigidly supported at the rear of a bicycle but which can be quickly removed, without tools, when not needed. Another object of my invention is to provide a quick detachable pair of baskets in which the detachment can be accomplished by releasing a connecting member which is within easy reach of the rider, thus avoiding the necessity of the rider having to lean over or keel down in accomplishing the detachment. A further object of my device is to provide a detaching mechanism that is adjustable to any bicycle having a lower rear stay whether the stay is parallel to the ground or at an angle thereto as in the product of certain manufacturers.

In the drawings,

Fig. 1 is a side elevation of the rear wheel housing of a bicycle with one form of my new basket attachment in place.

Fig. 2 is a fragmentary rear elevation of the device shown in Fig. 1, illustrating the connecting means between the upper portion of the baskets.

Fig. 3 is a fragmentary plan view of the supporting means for the lower portion of the baskets as shown in Fig. 1.

Fig. 4 is a sectional view on line 4—4 of Fig. 3.

Fig. 5 is a view similar to Fig. 4, but showing the manner in which the lower supporting means of the basket is disengaged from the lower rear stay.

Fig. 6 is an elevation in section similar to Fig. 4 of the preferred form of lower supporting means for my baskets on line 6—6 of Fig. 8.

Fig. 7 is a view similar to Fig. 6, illustrating the manner in which the preferred form of my supporting means is disengaged from the lower rear stay and Fig. 8 is a side elevation similar to Fig. 1 of the preferred form of lower supporting means of my device.

In the drawings, A is a well known type of bicycle having a rear wheel 10, rear mudguard 11, lower rear stay 12, upper rear stay 13, rear axle 14, retaining nut 15 and driving chain 16.

I provide a pair of substantially identical baskets 20 and 200 on each side 17 and 18 of the rear wheel housing structure 19 of A. I use the term rear wheel housing structure to include only the upper and lower rear stays on each side of the rear wheel or to include in addition any and all of the similar members which may also be mounted on a bicycle, for example, the mudguard 11, stays for the mudguard, covers for the chain 16 or U-shaped bicycle stands.

As shown in Figs. 1–5, I affix a forwardly extending strap 21 to each of my baskets such as 20, the rear portion of the strap at 22 being permanently affixed to the lower inside portion thereof by welding at 23 by bolts, rivets or in any other convenient way. The strap 21, in the embodiment shown in Figs. 1–5, extends along and above the rear stay 12 of bicycle A with a portion thereof at 24 resting on axle 14 or nut 15.

At or near the forward end of strap 21, I provide a vertically adjustable member 25 having a slot 26 in which a bolt 27, passing through a hole 28 in 21, may be positioned at the desired height by a nut 29. Member 25 has an inwardly projecting lug 30 arranged to rest on the upper surface of a lower rear stay 12 and thereby support the basket 20.

Intermediate of member 25 and point 24 on strap 21, I provide a second vertically adjustable member 31, having a slot 36 in which a bolt 37, passing through a hole 38 in 21 may be positioned at the desired height by a nut 39. Member 31 has a downwardly and inwardly extending portion 40 forming an upturned hook at 41 arranged to project below stay 12 and grasp the inside surface thereof at 42.

It will be apparent that whether a stay such as 12 is parallel to the ground or is at an angle thereto, my members 25 and 31 can be vertically adjusted in height to fit on the same by means of the slots 26 and 36 and that they can be adjusted for various sizes and cross sections of such stays.

In Fig. 2 I show the preferred manner of releasably connecting the rear upper portions of my pair of baskets. No connection is necessary at the forward upper portion of the baskets since the connection of the lower strap to the lower stay provides sufficient support and retaining means. An eye or loop 81 is provided at the inside rear of one basket 20 and a hook 80 is threadedly connected at 82 to the other basket of the pair, such as 200, in order that the device may be adjusted for various widths of rear wheel housing structures. It should be noted that hook 80 extends across the housing structure beyond the circumference thereof and is not designed to support the baskets on A, but merely to releasably connect the same across A.

I call the hook 80 and eye 81 the first releasable connecting means of my device.

I call the strap 21 and the lugs and/or hooks by which the strap is supported and retained on the lower rear stay, or in perforated plates carried by the stay, the second releasable connecting means of my device.

In Figs. 6, 7, and 8, I show the preferred form of the second releasable connecting means of my device in which a basket 50 has a forwardly extending strap 51 similar to strap 21 and similarly affixed to the basket. At the forward end of strap 51 I provide an inwardly-extending, down-turned hook 52 which may be integral with the strap, welded thereto or otherwise affixed thereon. Intermediate of the strap, I provide a second hook 53 similar to 52 and located proximate the axle 14 of rear wheel 10.

As shown in Fig. 6, a bracket 60 is provided preferably by flexible metal bent into clamp form at 61 to fit around and assume the shape of the cross section of stay 12. A bolt 62, passing through holes 63 and 64 in 60, and having a nut 65 permits the bracket 60 to be adjustably and permanently mounted on stay 12. 66 is a downwardly extending portion of bracket 60, in which one or more perforations 67 are provided into which hooks 52 may enter and be retained. As shown in Fig. 8, a second bracket or plate 70, having a hole 71 for axle 14 is mounted thereon and held in place by axle nut 15, the bracket or plate 70 also having one or more perforations 72 into which hook 53 may enter and be retained and supported thereon.

In operation, a pair of baskets such as shown in Figs. 1 to 5 may be installed on a bicycle with no parts permanently fixed on the bicycle. The members 25 and 31 are bolted at the desired height to fit the stay of the particular bicycle and are installed on the stay by first placing hook 41 of 31 under the stay while the basket is in the position of Fig. 5. The basket is then pivoted inwardly into the position shown in Fig. 4, so that part 30 of 25 and part 24 of stay 21 rest on the stay and hub axle or nut respectively and then hook 80 is inserted in eye 81 to connect the upper portions of the baskets.

To quickly remove the baskets, it is thus only necessary to remove hook 80 from eye 81 and move each basket outwardly and away from the sides 17 and 18 of rear wheel housing structure 19 at which time members 25 and 31 will disengage from stay 12 as shown in Fig. 5.

In the preferred embodiment shown in Figs. 6–8, the bracket or plate 60 is first attached permanently to the stay 12 and the bracket or plate 70 is attached permanently to axle 14. Hook 52 can then be inserted in a perforation 67 of 60 and hook 53 is simultaneously inserted in a perforation 72 of 70, in the position shown in Fig. 7. The baskets are then moved inwardly against the sides 17 and 18 of 19 and hook 80 inserted in eye 81.

Releasing a pair of baskets such as 50 is similar to releasing baskets such as 20, in that the hook 80 is first disengaged and then the baskets are each moved outwardly from sides 17 and 18 until hooks 52 and 53 disengage from the perforations on brackets 60 and 70.

I claim:

1. A removable package carrier, for bicycles and the like having a pair of lower rear stays, comprising a pair of baskets oppositely disposed on each side of the upper half of the rear wheel and rear wheel housing structure, of the bicycle; a first releasable connecting means extending between the upper portions of the baskets and located beyond the outer circumference of the rear wheel; and a pair of second releasable connecting means each mounted on the lower portion of a basket and each shaped and positioned to hookedly connect the lower portion thereof to the adjacent lower rear stay of the bicycle, said second releasable connecting means each including a forwardly extending strap, mounted on the lower portion of the basket, and partly supported on the hub axle, said strap having an inwardly projecting lug which rests on the upper surface of a lower rear stay and having an inwardly projecting, up-turned hook in contact with the lower and inside surface of said stay at a point between the lug and the axle.

2. A package carrier, for bicycles and the like having a pair of lower rear stays, said carrier comprising a pair of receptacles; first releasable connecting means, on the upper portion of each receptacle, arranged to releasably maintain each receptacle in contact with an opposite side of the upper half of the rear wheel housing structure of said bicycle; and a pair of second releasable connecting means, on the lower portion of each receptacle, each arranged to entirely support a receptacle on the adjacent lower rear stay of the bicycle, and each comprising a strap fixed to a receptacle and extending horizontally parallel to said stay and at least one open hook, carried by said strap, and hooked on said stay.

3. A package carrier, for bicycles and the like having a pair of lower rear stays, comprising a pair of wire baskets each located on opposite sides of the upper half of the rear wheel housing of the bicycle; first releasable connecting means extending between the upper rear portions of said baskets for releasably maintaining the same in contact with an opposite side of said housing; and a pair of second releasable connecting means, each mounted on the lower portion of a basket, for entirely supporting and retaining a basket on the lower rear stay of the bicycle, said first releasable connecting means comprising a hook threadedly mounted in one basket and an eye, arranged to receive said hook, mounted on the opposite basket and each of said second releasable connecting means comprising an elongated rigid strap carrying an open hook, proximate its forward end, partially encircling the adjacent rear stay.

4. A package carrier for bicycles and the like having a pair of lower rear stays and a pair of rear axle nuts, said package carrier comprising a pair of receptacles oppositely disposed on each side of the upper half of the rear wheel and rear wheel housing structure of said bicycle; a first releasable connecting means extending between each upper portion of said baskets and located beyond the outer circumference of the rear wheel; and a pair of second releasable connecting means, each mounted on the lower portion of a basket, and for supporting the lower portion of said basket to the adjacent lower rear stay of the bicycle, each said second releasable connecting means including a forwardly extending substantially horizontal strap supported intermediate thereof, by resting on the adjacent rear wheel axle nut and supported proximate the forward end, thereof, by an open hooked element shaped to partially encircle and rest on the adjacent lower rear stay of the bicycle but not clamped therearound.

5. A quick removable package carrier for bicycles, said carrier comprising the combination of a pair of substantially identical wire baskets oppositely disposed on each side of the upper rear quadrant of the rear wheel of a bicycle; a first quick releasable connecting means independent of said bicycle, extending between the top portions of the inside walls of said baskets and located beyond the outer circumference of the rear wheel of said bicycle for holding said baskets in parallel upright position on said bicycle and a pair of second quick releasable connecting means entirely supporting said baskets on said bicycle, each said second means comprising a strap fixed substantially horizontally along the bottom portion of the inside wall of a basket, and parallel to an adjacent horizontal member of said bicycle for sustaining the weight of said basket and two inwardly projecting rigid elements, fixed to, and spaced apart along each strap, said elements being shaped to form an open hook for retaining and supporting each strap on the adjacent horizontal member of said bicycle.

6. A combination as specified in claim 5 wherein the opening in each hook of said second quick releasable connecting means is positioned to disengage from the adjacent horizontal member of said bicycle when the top portion of a basket is rotated outwardly and downwardly around said open hook as a center to assume an inclined position.

References Cited in the file of this patent

UNITED STATES PATENTS

| | | |
|---|---|---|
| 639,708 | Certain | Dec. 26, 1899 |
| 643,373 | Gabriel | Feb. 13, 1900 |
| 1,154,197 | Musselman | Sept. 21, 1915 |
| 2,109,315 | Harley | Feb. 22, 1938 |

FOREIGN PATENTS

| | | |
|---|---|---|
| 18,119 | Great Britain | Aug. 6, 1912 |
| 656,020 | France | Dec. 24, 1928 |
| 870,062 | France | Dec. 5, 1941 |
| 458,148 | Canada | Oct. 15, 1947 |
| 618,975 | Great Britain | Mar. 2, 1949 |